United States Patent
Decker

(10) Patent No.: US 9,596,433 B2
(45) Date of Patent: *Mar. 14, 2017

(54) SYSTEM AND METHOD FOR A HYBRID TOPOLOGY MEDIA CONFERENCING SYSTEM

(71) Applicant: Polycom, Inc., San Jose, CA (US)

(72) Inventor: Eran Decker, Givataeeim (IL)

(73) Assignee: Polycom, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/093,840

(22) Filed: Apr. 8, 2016

(65) Prior Publication Data

US 2016/0227169 A1  Aug. 4, 2016

Related U.S. Application Data

(63) Continuation of application No. 14/674,662, filed on Mar. 31, 2015, now Pat. No. 9,338,401.

(Continued)

(51) Int. Cl.
| | |
|---|---|
| *H04N 7/15* | (2006.01) |
| *H04N 19/40* | (2014.01) |
| *H04L 29/06* | (2006.01) |
| *H04N 7/14* | (2006.01) |
| *H04N 21/2343* | (2011.01) |
| *H04N 21/422* | (2011.01) |
| *H04N 21/4223* | (2011.01) |
| *H04N 21/4788* | (2011.01) |
| *H04N 21/63* | (2011.01) |

(52) U.S. Cl.
CPC ............ *H04N 7/152* (2013.01); *H04L 65/00* (2013.01); *H04N 7/147* (2013.01); *H04N 19/40* (2014.11); *H04N 21/2343* (2013.01); *H04N 21/4223* (2013.01); *H04N 21/42203* (2013.01); *H04N 21/4788* (2013.01); *H04N 21/632* (2013.01)

(58) Field of Classification Search
USPC ...................................................... 348/14.09
See application file for complete search history.

(56) References Cited

U.S. PATENT DOCUMENTS

| | | |
|---|---|---|
| 7,007,098 B1 | 2/2006 | Smyth et al. |
| 2008/0259823 A1 | 10/2008 | Eisenberg |

(Continued)

FOREIGN PATENT DOCUMENTS

| | | |
|---|---|---|
| JP | 2009-518996 | 5/2009 |
| WO | 2012-175227 | 12/2012 |

OTHER PUBLICATIONS

PCT Search Report filed in co-pending PCT Application No. PCT/US15/23566 dated Jul. 10, 2015, 15 pages.

*Primary Examiner* — Creighton Smith
(74) *Attorney, Agent, or Firm* — Blank Rome LLP

(57) ABSTRACT

Examples hybrid topologies of a conferencing system are disclosed. An example of a hybrid topology may comprise a plurality of endpoints and a central entity. Each of said plurality of endpoints may provide its primary video stream and audio stream to said centralized entity. The centralized entity provides the primary speaker stream and the mixed audio stream to each of said plurality of endpoint participants. In addition, some of plurality of endpoint establishes low bandwidth/low resolution media streams with other of said plurality of endpoint participants for non-speaker video.

14 Claims, 7 Drawing Sheets

Related U.S. Application Data

(60) Provisional application No. 61/973,059, filed on Mar. 31, 2014.

(56) References Cited

U.S. PATENT DOCUMENTS

| | | | |
|---|---|---|---|
| 2009/0315975 A1* | 12/2009 | Wiener | H04N 7/152 348/14.09 |
| 2011/0187813 A1* | 8/2011 | Musgrave | H04N 7/15 348/14.09 |
| 2013/0194378 A1 | 8/2013 | Brown | |
| 2014/0022331 A1 | 1/2014 | Bansal | |
| 2015/0271447 A1 | 9/2015 | Glass | |

* cited by examiner

*ICON

SYSTEM AND METHOD FOR A HYBRID TOPOLOGY MEDIA CONFERENCING SYSTEM

BACKGROUND OF THE INVENTION

1. Field of the Invention

The invention relates to conferencing systems.

2. Description of the Related Art

As every day applications and services migrate to Internet Protocol (IP) networks at a remarkable rate, and with the growth of the variety of multimedia conferencing equipment, more and more people use multimedia conferencing as their communication tool. Today multimedia conferencing communication can be carried using a plurality of conferencing techniques. Following are few examples of conferencing techniques: the AVC multimedia conferencing method and the media relay conferencing method. AVC stands for Advanced Video Coding. In this disclosure, the terms: multimedia conference, video conference (with or without content) and audio conference may be used interchangeably and the term video conference can be used as a representative term of them.

Usually an AVC multipoint conference between three or more participants requires a AVC Multipoint Control Unit (MCU). An AVC MCU is a conference controlling entity that is typically located in a node of a network or in a terminal which receives several channels from a plurality of endpoints. According to certain criteria, the AVC MCU processes audio and visual signals and distributes them to each of the participating endpoints via a set of connected channels. Examples of AVC MCUs include the RMX® 2000, which are available from Polycom, Inc. (RMX is a registered trademark of Polycom, Inc.) A terminal in the AVC-communication method, which may be referred to as a AVC endpoint (AVCEP), is an entity on the network, capable of providing real-time, two-way audio and/or audio visual communication with another AVCEP or with the MCU. A more thorough definition of an AVCEP and an MCU can be found in the International Telecommunication Union ("ITU") standards, such as but not limited to the H.320, H.324, and H.323 standards, which can be found at the ITU Website: www.itu.int.

A common MCU, referred to also as a AVC MCU, may include a plurality of audio and video decoders, encoders, and media combiners (audio mixers and/or video image builders). The MCU may use a large amount of processing power to handle audio and video communication between a variable number of participants (AVCEPs). The communication can be based on a variety of communication protocols and compression standards and may involve different types of AVCEPs. The MCU may need to combine a plurality of input audio or video streams into at least one single output stream of audio or video, respectively, that is compatible with the properties of at least one conferee's AVCEP to which the output stream is being sent. The compressed audio streams received from the endpoints are decoded and can be analyzed to determine which audio streams will be selected for mixing into the single audio stream of the conference. Along the present disclosure, the terms decode and decompress can be used interchangeably.

A conference may have one or more video output streams wherein each output stream is associated with a layout. A layout defines the appearance of a conference on a display of one or more conferees that receive the stream. A layout may be divided into one or more segments where each segment may be associated with a video input stream that is sent by a certain conferee via his/her AVCEP. Each output stream may be constructed of several input streams, resulting in a continuous presence (CP) image. In a CP conference, a user at a remote terminal can observe, simultaneously, several other participants in the conference. Each participant may be displayed in a segment of the layout, where each segment may be the same size or a different size. The choice of the participants displayed and associated with the segments of the layout may vary among different conferees that participate in the same session.

The second type of communication method is Media Relay Conferencing (MRC). In MRC, a Media Relay MCU (MRM) receives one or more streams from each participating Media Relay Endpoint (MRE). The MRM relays to each participating endpoint a set of multiple media streams received from other endpoints in the conference. Each receiving endpoint uses the multiple streams to generate the video CP image, according to a layout, as well as mixed audio of the conference. The CP video image and the mixed audio are played to MRE's user. An MRE can be a terminal of a conferee in the session which has the ability to receive relayed media from an MRM and deliver compressed media according to instructions from an MRM. A reader who wishes to learn more about an example of an MRC, MRM or an MRE is invited to read the U.S. Pat. No. 8,228,363, which is incorporated herein by reference. In the following, the term endpoint may represent also an MRE.

In some MRC systems, a transmitting MRE sends its video image in two or more streams; each stream can be associated with different quality level. The qualities may differ in frame rate, resolution and/or signal to noise ratio (SNR), etc. In a similar way each transmitting MRE may sends its audio in two or more streams that may differ from each other by the compressing bit rate, for example. Such a system can use the plurality of streams to provide different segment sizes in the layouts, different resolution used by each receiving endpoint, etc. Further, the plurality of streams can be used for overcoming packet loss.

Today, MRC becomes more and more popular. Many video conferencing systems deliver a plurality of quality levels in parallel within one or more streams. For video, for example, the quality can be expressed in number of domains, such as temporal domain (frames per second, for example), spatial domain (HD versus CIF, for example), and/or in quality (sharpness, for example). Video compression standards, for example, that can be used for multi quality streams are H.264 AVC, H.264 annex G (SVC), MPEG-4, etc. More information on compression standards such as H.264 can be found at the ITU Website www.itu.int, or at www.mpeg.org.

H.323 is an ITU standard. A reader who wishes to learn more about video conferencing standards and protocols is invited to visit the International Telecommunication Union ("ITU") at the ITU Website: www.itu.int or at the Internet-Engineering-Task Force (IETF) Website: www.ietf.org. AVC multipoint conference system, MRC, MCU, an AVC endpoint, MRE, a Web conferencing client, and a VMR are well known to a person with ordinary skill in the art and have been described in many patents, patent applications and technical books. As such these will not be further described. Following are examples of patents and patent applications that describe videoconferencing systems: U.S. Pat. Nos. 6,496,216, 6,757,005, 7,174,365, 7,085,243, 8,411,595, 7,830,824, 7,542,068, 8,340,271, 8,228,363, and others.

In the two types of communication methods, the AVC and the MRC, a central entity is needed for handling signaling and the media streams (audio, video), an MCU or an MRM (respectively), for example. In order to establish a video conferencing system an endpoint can call a central unit such as an MCU or a virtual MCU. A virtual MCU (VMCU) can be a network device, a control server for example, that can communicate with a plurality of MCUs and a plurality of endpoints. A user initiates a reserve conference and/or an ad-hoc conference can communicate with the VMCU. If sufficient resources are available on one or more MCUs, the reservation is made and connection numbers are assigned. When the time for the conference arises, one or more MCU are assigned to the conference and the participants are then be connected to the conference. A reader who wishes to learn more about a VMCU is invited to read a plurality of patents and patent applications such as U.S. Pat. No. 7,174,365, U.S. Pat. No. 7,492,730, and many others. An example of a VMCU can be a product such as a DMA® sold by Polycom Inc. (DMA is a registered trademark of Polycom, Inc.)

After establishing the session each endpoint sends its media streams to an MCU or an MRM. The MCU or the MRM process the media stream according to the type of the communication methods and transfers the relevant streams to receiving endpoints. Along the description and the claims the term MCU can be used as a representative term for an MRM and a AVC MCU.

An MCU may comprise a Multipoint-Controller (MC) and a Multipoint-Processor (MP). The MC can be a packet-switch (SW) network entity that is located at the network that provides the signaling and control of three or more terminals participating in a multipoint conference. An example of packet SW network can be an IP network. The MC may also connect two terminals in a point-to-point conference, which may later develop into a multipoint conference. The MC provides capability negotiation with all terminals to achieve common levels of communications, and may also control conference resources. The MC signaling and control can be implemented by using a standard signaling protocol such as SIP. SIP stands for Session Initiation Protocol. A reader who wishes to learn more about SIP is invited to visit the IETF (Internet Engineering Task Force) web site: www.ietf.org. However, the MC does not perform mixing or switching of audio, video and data. The Multi-point Processor (MP) is a media entity on the network providing the centralized processing of audio, video, and/or data streams in a multipoint conference.

The MP provides the media processing such as decoding, mixing, composing, encoding, switching, routing or other processing of media streams under the control of the MC. The MP may process a single media stream or multiple media streams depending on the type of conference supported. A single MC can control a plurality of MPs.

Two common topologies are used in support of multi-point conferencing today:

A1) Centralized Topology (FIG. 1): with this method, all participants 110 send one or more media streams 120 up to a central media processing entity 130, and each receives one or more streams 140 from the same centralized entity 130. The streams 120 transmitted upstream to the centralized entity 130 can include one or more local camera feeds and one or more content feeds. The streams 140 transmitted back from the centralized entity 130 are rendered on screen and shown to the participant. When using a centralized approach, two flavors are used today:

A. Transcoding: where the central entity 130 transcodes all incoming and outgoing streams, typically using an MCU such as an AVC MCU. With this approach the centralized entity consumes a lot of compute resources per participant. This becomes an issue for scale and the budget needed for allocating such resources.

B. Media Relay: where the centralized entity 130, typically an MRM, relays all incoming and outgoing streams. With current relay deployments, the centralized entity 130 receives one or more streams 120 from each participant 110, and sends multiple streams 140 back down to that participant 110, so the participant 110 can see the other participants 110 in the call. This means that all media must flow through a single entity, which could become a bottleneck.

2) Mesh Topology (FIG. 2): with this method, streams 220 are sent peer-to-peer between the participants 210. Each participant 210 sends a copy of its stream(s) to each of the other participants 210 and receives media stream(s) from each other participant 210 in the session.

Each method carries its own limitations. Centralized topology sessions depend on heavy lifting media transcoding resources which are expensive and have scaling limitations. Mesh topology sessions require a good deal of CPU on each endpoint 210 for processing the streams being sent and received, and the total the amount of bandwidth required by each participant can also be substantial in order to have a successful experience.

SUMMARY OF THE INVENTION

In a hybrid topology, each participant delivers, in parallel, multiple media streams: a primary video stream with a higher resolution/bandwidth and additional streams having lower resolution/bandwidth.

Each participant provides its primary video stream, audio stream, and optionally one or more content streams to a centralized entity. It also provides low bandwidth/low resolution video streams to the other participants. Each participant receives the primary speaker's or speakers' stream(s), optional content stream(s) and the mixed audio stream from the centralized entity. In addition, each participant receives one or more low bandwidth/low resolution video streams from the other participants.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Embodiments according to the present invention use a hybrid approach in which participants use mesh and centralized topologies at the same time, gaining benefits over using just one or the other.

Figure 1:
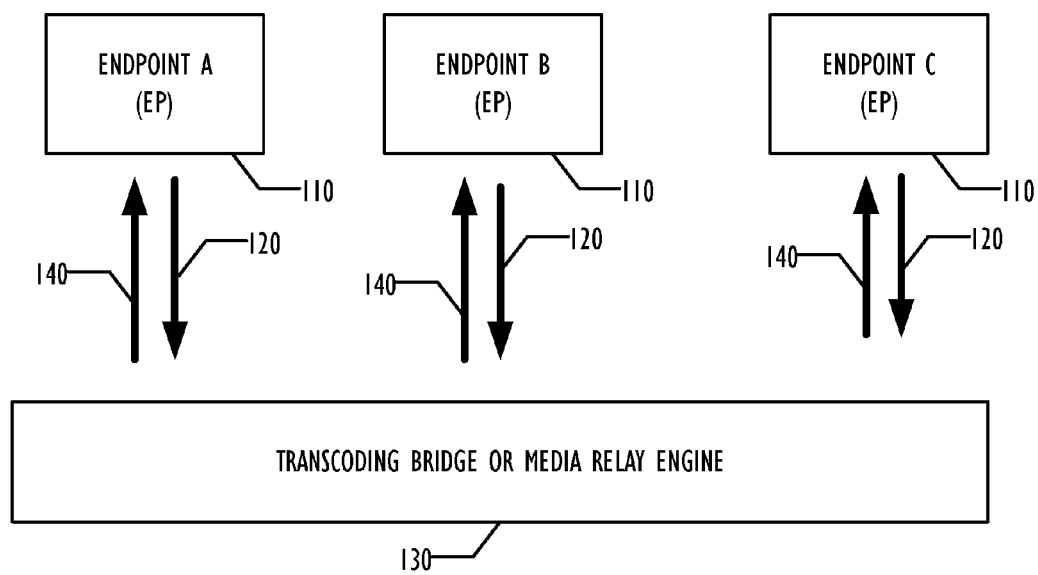
FIG. 1 illustrates a conferencing system according to the prior art using a centralized entity.
Figure 2:
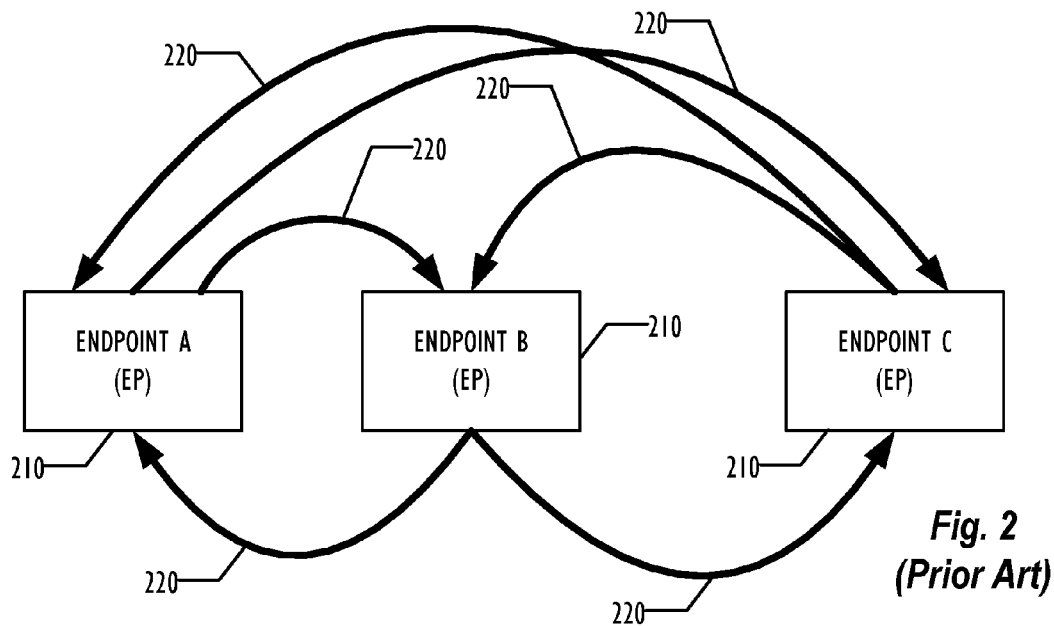
FIG. 2 illustrates a conferencing system according to the prior art using peer to peer communications.
Figure 3:
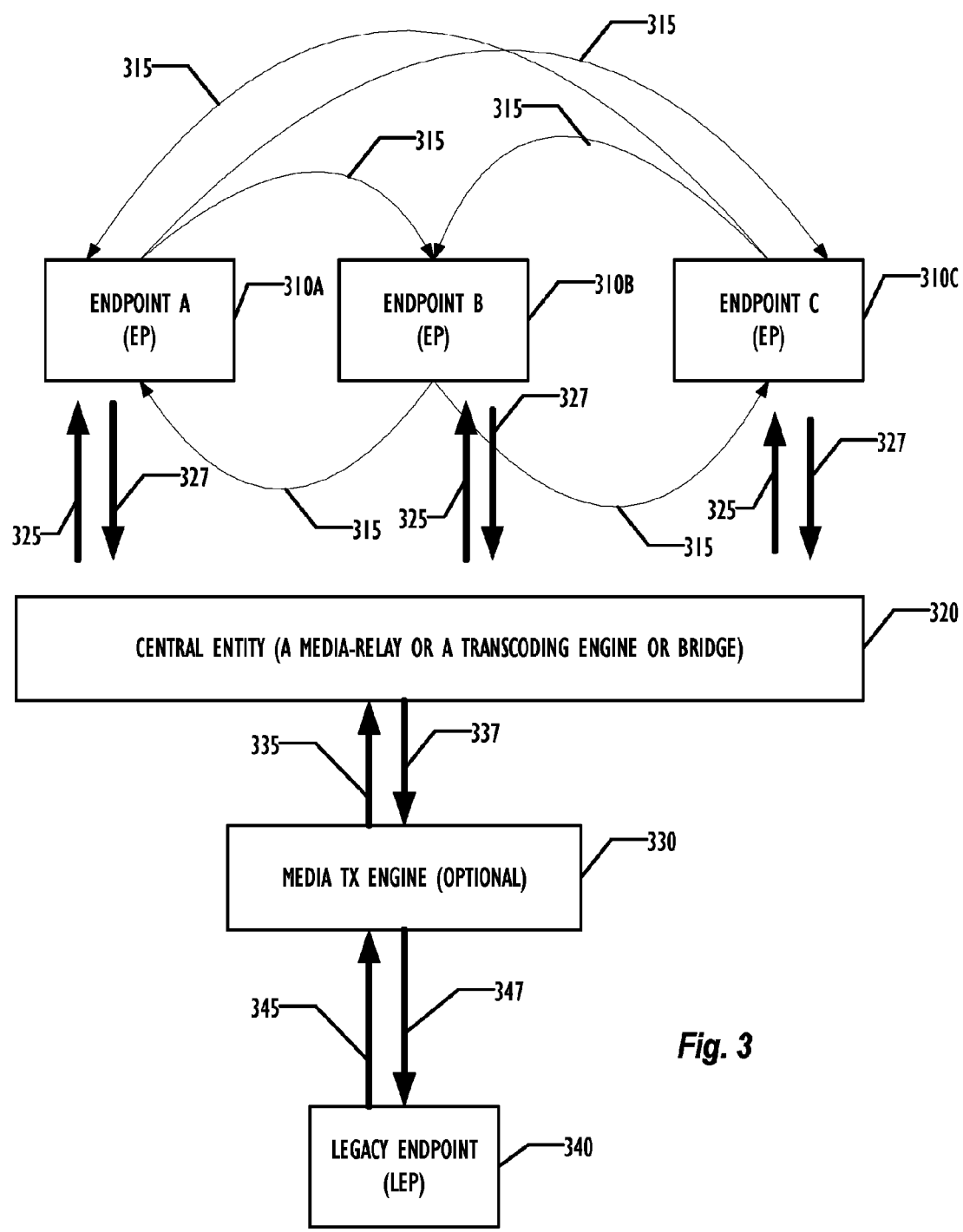
FIG. 3 illustrates a first embodiment of a hybrid topology conferencing system.

An example of a hybrid topology is shown in FIG. 3, in which mesh endpoints 310A-C communicate between themselves via mesh connections 315 while at the same time they communicate with a centralized entity 320, while one or more legacy endpoints 340 communicate with a centralized entity 320 via a media transcoding engine 330.

Video Handling

As each participant 310 joins the session, each participant 310 sends its main video feed (e.g., its camera source) and optionally one or more content feeds 327 upstream to a centralized entity 320 that could be either a media-relay or a transcoding engine or bridge. The centralized entity 320, in turn, sends back a high resolution/bandwidth video stream 325 of the active speaker and one or more content streams, if any exist. In some embodiments, the centralized entity 320 may return multiple streams 325 representing a plurality of subset of active speakers and one or more content streams. The structure and functionality of the central entity 320 is known to the art.

Each participant 310 also establishes mesh connections 315 with the other participants 310 to send and receive video of non-speakers only. These are low resolution/low bitrate connections 315.

In some embodiments, legacy endpoint 340 may connect to the conference session through a media transcoding engine 330 that connects to the central entity 320, sending a video stream 345 to the media transcoding engine 330, which transcodes the stream into transcoded stream 335 and sends transcoded stream 335 to the central entity 320. Similarly, the central entity 320 may send back a high resolution/bandwidth video stream 337 to the transcoding engine 330, which transcodes the video stream 337 and sends transcoded video stream 347 to the legacy endpoint 340. The media transcoding engine 330 is optional and can be omitted where transcoding is unnecessary or can be performed by the central entity 320. Multiple legacy endpoints may be connected via the media transcoding engine 330 in some embodiments, or may connect directly to the central entity 320 as desired.

Audio Handling

In one embodiment, as each participant joins the session, each participant 310 sends its main audio feed 327 (e.g., its microphone source) upstream to the centralized entity 320 that could be a media-relay or a transcoding engine or bridge. The centralized entity 320, in turn, sends back an audio mix 325 of all (or a selected subset of) the conference participants 310. In this embodiment, audio streams are not sent via meshed connections among the participants 310. In an embodiment which does not use a media transcoding engine 330, the central entity 320 may transcode the audio streams as necessary in order to send the audio streams as streams 337 to legacy endpoints 340. In some embodiments, the central entity 320 may mix the audio streams 327 into a single audio stream 337 for delivery to either the media transcoding engine 330 or to the legacy endpoint 340. In other embodiments, either the transcoding engine 330 or the legacy endpoint 340 may perform the audio mixing.

In an alternate embodiment, each participant 310 sends its main audio feed (e.g., its microphone source) to each of the other participants 310 in the call via the mesh connections 315. Each of the participants 310 in the call performs a local mix of the audio streams that participant 310 receives via the mesh connections 315. In addition, each participant 310 sends its main audio feed upstream as stream 327 to the centralized entity 320. The centralized entity 320 sends the audio streams as streams 337 toward a media transcoding engine 330. The media transcoding engine 330 sends an audio mix 347 of all (or selected subset of) the conference participants to one or more legacy endpoints 340. The legacy endpoint 340 sends its audio stream 345 to the Media transcoding engine 330 for sending to the central entity 320, which then delivers that audio stream to the meshed participants 310 as streams 325.

The Media transcoding engine 330 can transcode the media streams, signaling, and control needed in order to connect to the legacy endpoint with the centralized entity 320. A reader who wish to learn more about the media transcoding engine 330 is invited to read U.S. Pat. No. 8,228,363 or U.S. Pa. Pub. No. 20140028788, the content of which are incorporated herein by reference.

Example Use Cases

Figure 4:
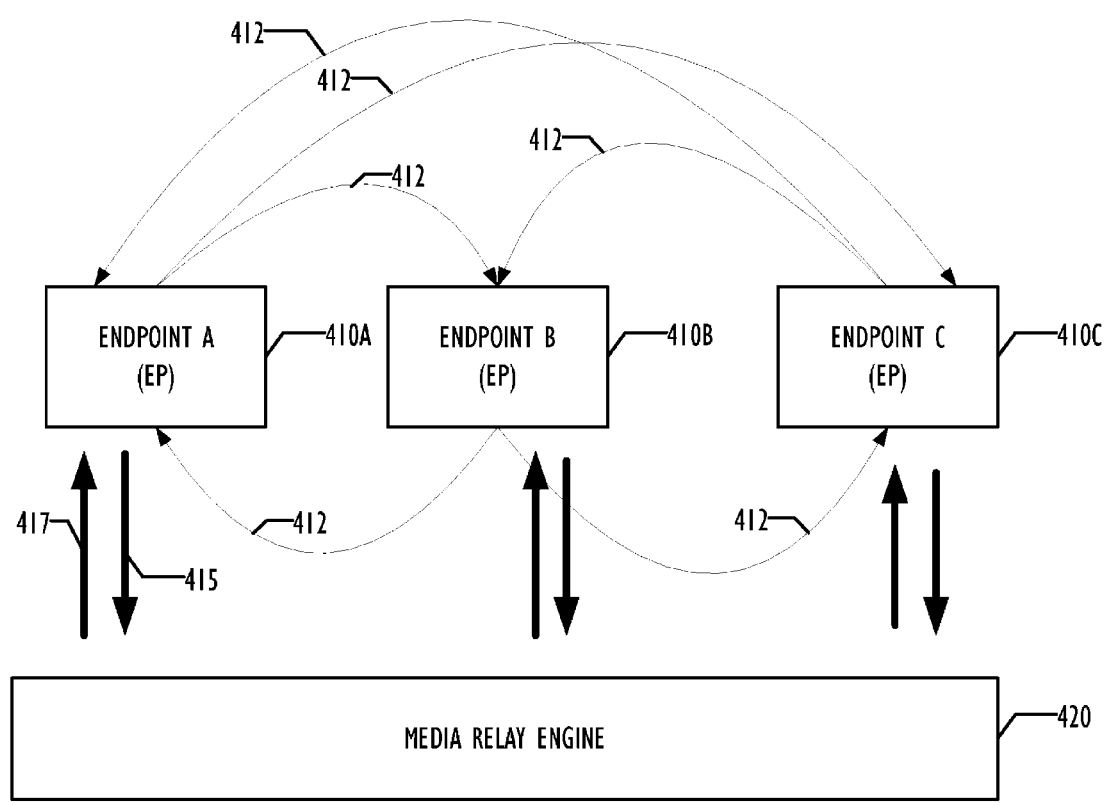
FIG. 4 illustrates a second embodiment of a hybrid topology conferencing system.

FIG. 4 illustrates the case where all participants 410 use compatible codecs. Each participant 410 sends its main video feed (e.g., its camera source) and optionally one or more content feeds 415 upstream to a centralized entity 420. The centralized entity 420, in turn, sends back a high resolution/bandwidth video stream 417 of the active speaker and the content stream(s), if they exist. Where there are multiple active speakers, the centralized entity 420 may return multiple streams 417 representing the subset of active speakers in some embodiments. Each participant 410 establishes mesh connections 412 with the other participants 410 to send and receive video of non-speakers only. These are low resolution/low bitrate connections 412.

All participants 410 have available compatible audio and video codecs and elect to use them. In this case, we can use media-relay at the central entity 420. In some embodiments, the central entity 420 can mix the audio streams of all or selected participants but do not need to transcode any video streams.

Figure 5:
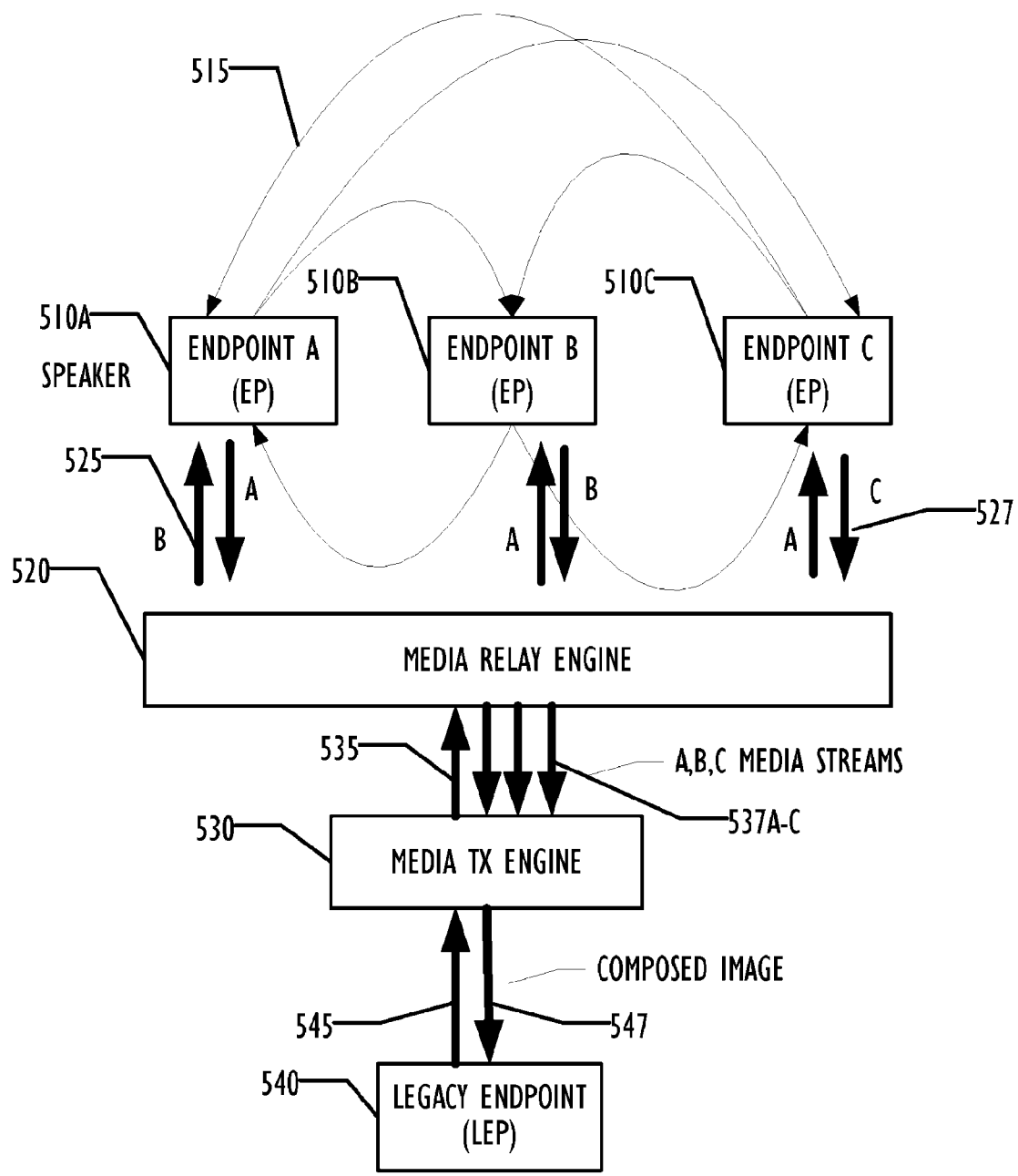
FIG. 5 illustrates a third embodiment of a hybrid topology conferencing system.

FIG. 5 illustrates the case where some of the participants use non-compatible codecs. In the illustrated example, a legacy endpoint 540 may use a different codec for audio or video than the other endpoints 510 in the session. Each participant 510 sends its main video feed (e.g., its camera source) 527 and optionally one or more content feeds upstream to a centralized entity 520. In this example, the centralized entity 520 transcodes the video for the active speaker coming from one or more legacy endpoints 540 and mixes the audio streams of all participants 510. The centralized entity 520 sends high resolution video for the active speaker to the endpoints 510 in streams 525. The endpoints 510 use mesh connections 515 for sending low bandwidth/load bitrate video between the endpoints 510.

The centralized entity 520 sends the media streams 537A-C toward a media transcoding engine 530. The media transcoding engine 530 sends a composed media stream 547 that contains an audio mix of all (or a selected subset of) the conference participants 510, a composed video image, and optionally one or more content streams. The composed media stream 547 is transferred to one or more legacy endpoints 540 to be rendered to the user of the one or more legacy endpoints 540. In the other direction, the legacy endpoint 540 sends its media streams 545, including audio, video, and content, if any, to the media transcoding engine 530, which in turns sends streams 535 to the centralized entity 520, typically a media relay engine for delivery as streams 525 to the other endpoints 510.

Figure 6:
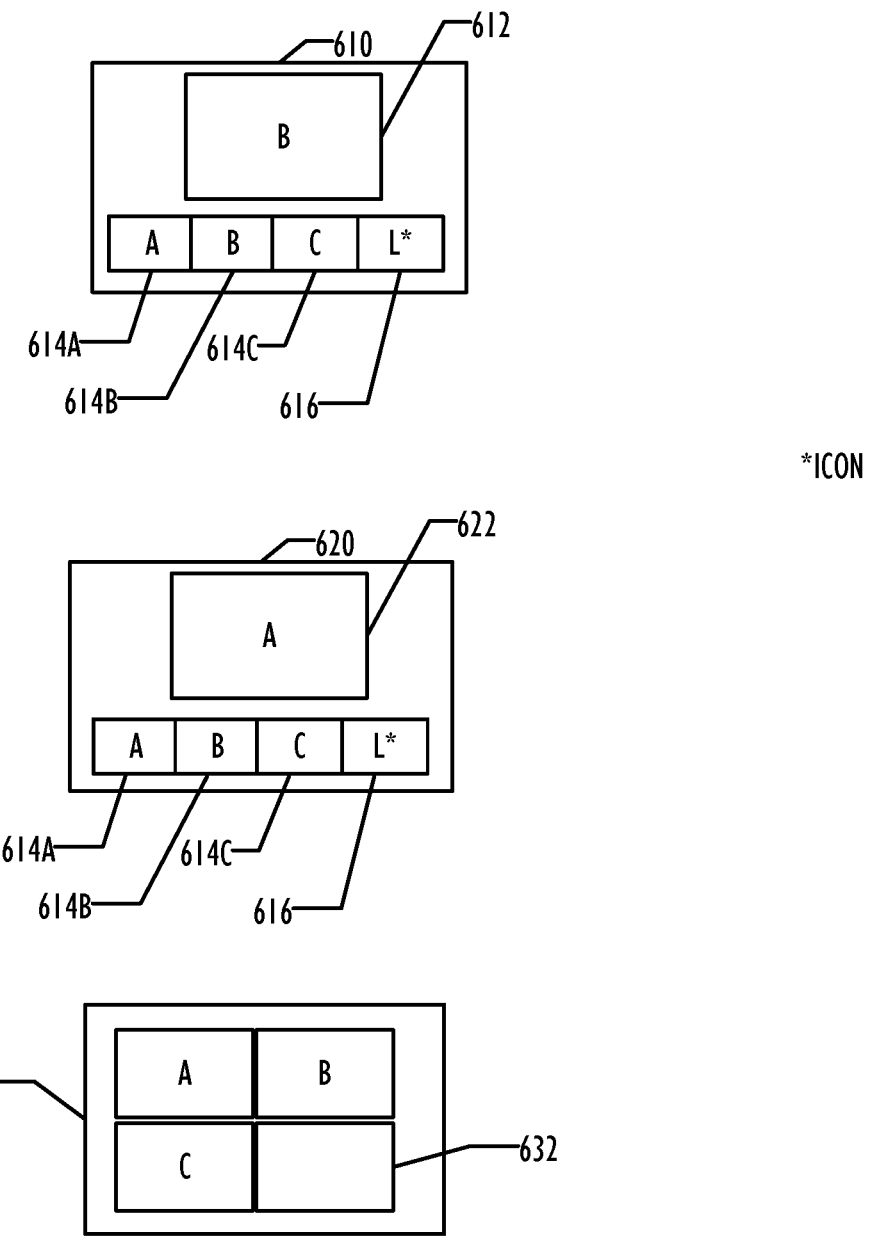
FIG. 6 illustrates examples of possible layouts presented by some endpoints at a certain point in time according to one embodiment.

In addition, FIG. 6 illustrates examples of possible layouts 610, 620, and 630 presented by some endpoints at a certain point in time. Example layout 610 represents a layout that may be shown to user of endpoint 510A, which is the current speaker. In this example, main segment 612 displays video from endpoints 510B, the previous speaker, instead of showing the self-image of participant 510A.

Example layout 620 represents a layout that would be shown to user of endpoint 510B or 510C, which are not the current speaker. In this example, main segment 622 displays video from endpoint 510A, the current speaker.

Example layout 630 represents a layout that would be shown to user of legacy endpoint 540, which each of endpoints 510A, 510B, and 510C displayed in a 2x2 arrangement, with segment 632 being empty.

In the examples illustrated in FIG. 6, each of layouts 610, 620 is showing participants 510A, 510B, and 510C as segments 614A, 614B, and 614C, while the legacy endpoint 540 is represented by an icon 616. In some embodiments, the icon 616 may be a still image of the user of legacy endpoint 540. In other embodiments, the icon 616 can be a graphical representation of the user, or a text displaying the name of the user of legacy endpoint 540, the name of the site where endpoint 540 is located, or any other graphical representation. The icon image 616 may be obtained, for example, from a memory device (not shown) which can be connectively coupled with each of the endpoints 510.

In the examples illustrated in FIG. 6, each of layouts 610, 620 is showing a self-image of participants 510A, 510B, and 510C. In another embodiment, each of the layouts 610-630 may exclude the self-image of the relevant participant, for example in the layout 610 for endpoint 510A, the segment 614A may be excluded, displaying only segments 614B, 614C, and 616.

Some of the benefits of the hybrid approach include:
1. In comparison to the full mesh approach, with the hybrid topology each participant needs to send and receive only one single high resolution/high bandwidth media stream, and process only a single audio stream. Full mesh topology requires a participant's endpoint to send N−1 (with N the number of participants in the session) high resolution/high bandwidth streams when that participant becomes the speaker. Thus, the hybrid approach reduces the bandwidth consumption.
2. In comparison to the fully-transcoded centralized topology approach, the hybrid topology method uses much less compute resources. That is, the centralized entity is only required to relay the speaker media and perform the audio mixing. This requires much less processing resources than having all incoming and outgoing audio and video streams requiring transcoding.

Figure 7:
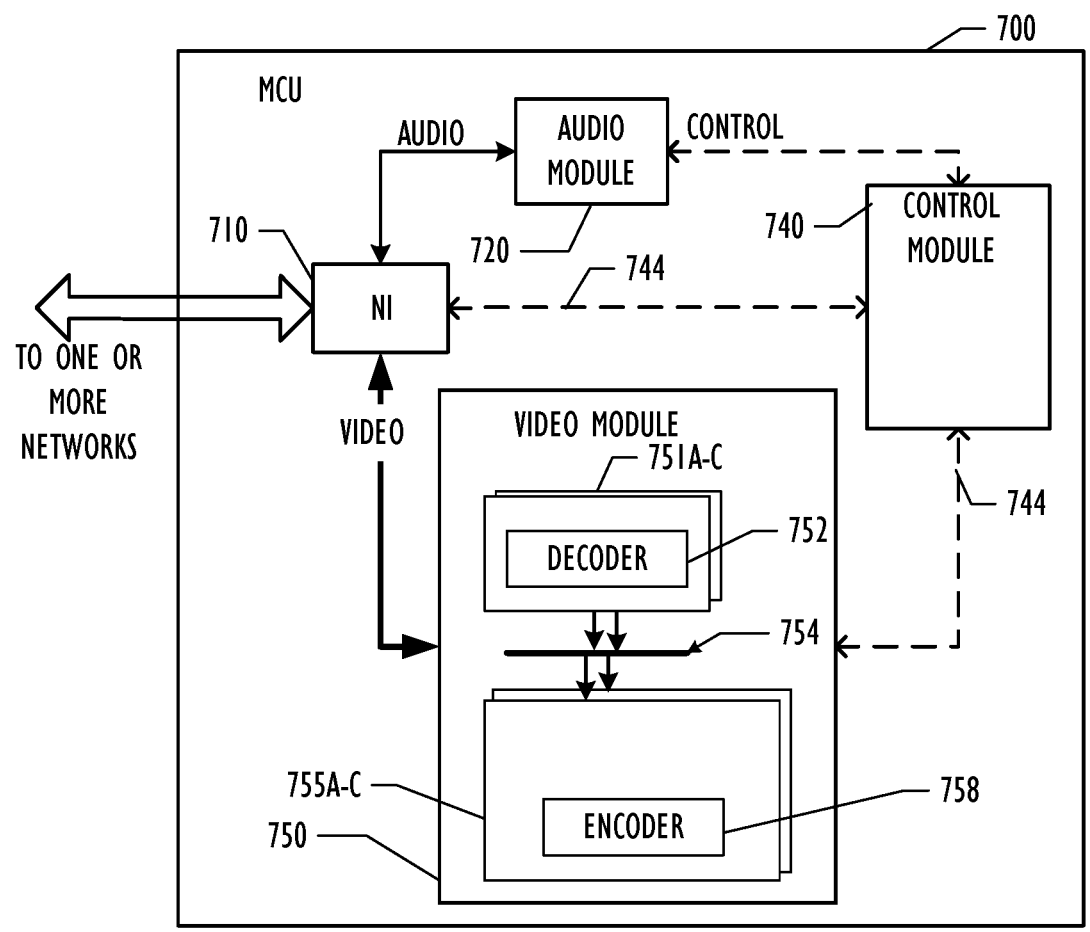
FIG. 7 is a block diagram illustrating components of a centralized entity according to one embodiment.
Figure 8:
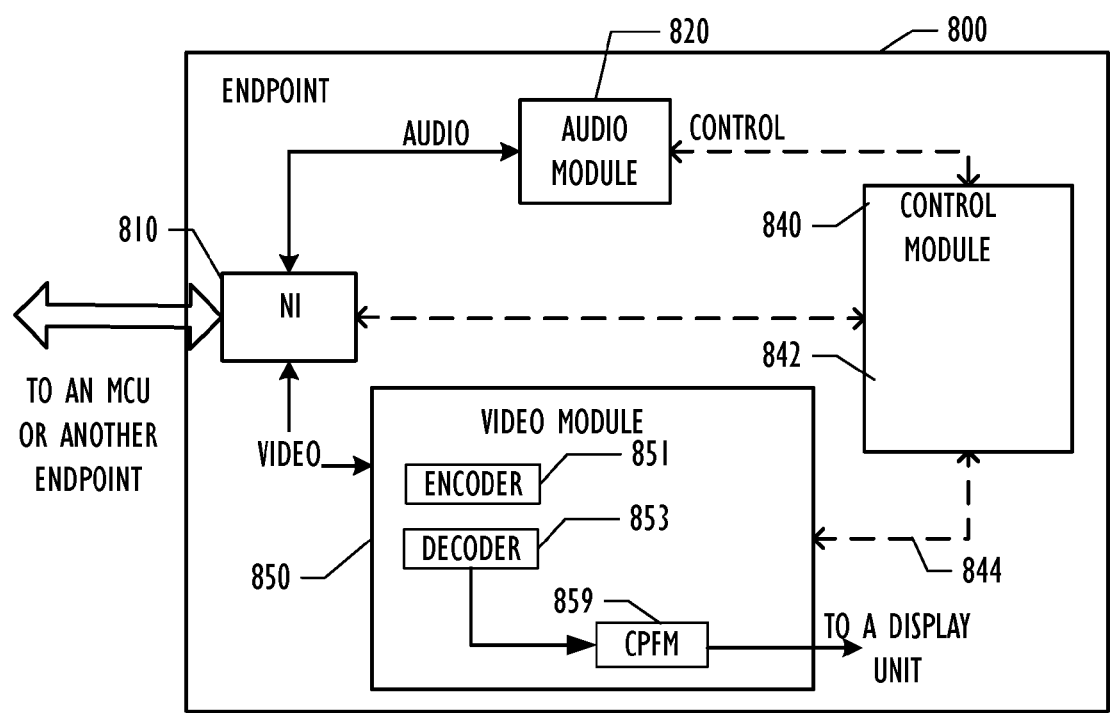
FIG. 8 is a block diagram illustrating components of an endpoint according to one embodiment.

FIGS. 7-8 are block diagrams that illustrate relevant elements of example embodiments of a centralized entity 700 (in this example, an MCU) and an endpoint 800. Centralized entity 700 is capable of implementing aspects of the disclosed methods for controlling a hybrid topology media conferencing system. An example embodiment of centralized entity 700 may comprise one or more processors, computer readable medium such as a read/write hard disc, CDROM, Flash memory, ROM, or other memory or storage devices, etc. Software of a logical module may be embodied on one of the computer readable medium. In order to execute a certain task, a software program may be loaded to an appropriate processor as needed.

Centralized entity 700 may include a network interface module (NI) 710, an audio module 720, a control module 740 and a video module 750. The network interface module 710 receives communication from a plurality of endpoints via one or more networks (not shown in the figures). Network interface 710 processes the communication according to one or more variety of communication standards such as but not limited to H.320, H.323, SIP, etc. and compression standards such as H.261, H.263, H.264, G711, G722; MPEG etc. Network interface 710 can receive and transmit control and data information to/from other centralized entities 700 and endpoints 800. More information concerning the communication between the endpoint and the centralized entity 700 over the relevant network and information that describing signaling, control, compression, and setting a video call can be found in the international telecommunication union (ITU) standards H.320, H.321, H.323, H.261, H.263 and H.264 or SIP.

Network interface module 710 multiplexes/de-multiplexes the different signals, media and/or "signaling and control," that are communicated between the endpoints and the centralized entity 700. The compressed audio signal is transferred to and from the audio module 720. The compressed video signal is transferred to and from video module 750 and the "control and signaling" is transferred to and from control module 740.

Audio module 720 may receive, via network interface 710 and the audio line, compressed audio streams from the plurality of endpoints. The audio module 720 decodes the compressed audio streams, analyzes the decoded streams, selects certain streams and mixes the selected streams. Then the mixed stream is compressed and the compressed audio stream is sent via the audio line back to the network interface 710 which sends the compressed audio streams to the different endpoints. Audio streams that are sent to different endpoints can be different. For example the audio stream can be formatted according to the different communication standard and according to the needs of the individual endpoint. Audio streams may exclude the voice of the user associated with the endpoint to which the audio stream is sent. However, the voice of this user can be included in all other audio streams. Audio module 720 can be adapted to analyze the received audio signals from the endpoints and determined the energy of each audio signal. Information on the signal energy can be transferred to the control module 740. The energy level can be used as a selection parameter for selecting appropriate one or more endpoints as the source of the mixing of the audio and/or the video of the conference. The endpoints can be referred as selected endpoints or presented endpoints.

Video module 750 receives compressed video streams from the plurality of endpoints (not shown in FIG. 6), which are sent toward the centralized entity 700 via a relevant network (not shown in the figures) and processed by network interface 710. Video module 750 can create one or more compressed CP video images according to one or more layouts that are associated with one or more conferences currently being conducted by the centralized entity 700. An example of video module 750 can have a plurality of input modules 751A-C, a plurality of output modules 755a-c and a video common interface 754. Each input module 751A-C can be associated with an endpoint. Each output module 755A-C can be associated with one or more endpoints that can receive and process a similar CP video image.

Control module 740 can be a logical unit that controls the operation of the centralized entity 700 using control lines 744. In addition to common operation of a typical centralized entity 700, centralized entity 700 is capable of additional functionality as result of having control module 740.

Returning now to describe the elements of the video module 750 of the exemplary centralized entity 700. Exemplary input module 751A-C can include among other elements a decoder 752. The decoder 752 receives compressed video from an associated endpoint. An associated endpoint is an endpoint that is associated with the relevant input module 751. The decoder 752 decodes the compressed video into decoded video data. The decoded information is stored in a decoder frame memory from which it is transferred toward one or more output modules 755A-C via common interface 754.

Among other elements, an exemplary output module 755A-C may include an encoder 758.

In some embodiments the centralized entity 700 can be configured to deliver the presented CP video image. The presented CP video image complies with the parameters of a display unit of a receiving endpoint (REP).

Data in a frame memory can be encoded (compressed) by the encoder 758. The compression can comply with the compression standard and parameters as defined during negotiation with the REP. The common interface 754 may include any of a variety of interfaces, such as but not limited to shared memory, ATM bus, TDM bus, switching and direct connection, etc. ATM stands for Asynchronous Transfer Mode, TDM stands for time division multiplexing.

FIG. 8 illustrates a block diagram with relevant elements of example embodiments of an audio-video endpoint 800. The illustrated example of endpoint 800 is adapted to process a receiving compressed video image from an centralized entity 700. An example embodiment of endpoint 800 may comprise one or more processors, computer readable medium such as a read/write hard disc, CDROM, Flash memory, ROM, or other memory or storage devices, etc. Software of a logical module may be embodied on one of the computer readable medium. In order to execute a certain task, a software program may be loaded to an appropriate processor as needed.

The endpoint 800 is capable of obtaining the compressed video image, decoding the compressed video, and processing the decoded data of the video image in order to create a presented CP video image. The presented CP video image can be delivered to the display unit (not shown in the drawings) of the endpoint 800.

An example of endpoint 800 can comprise a network interface (NI) 810, an audio module 820, a control module 840, and a video module 850. The NI 810 can communicate with a centralized entity 700 or another endpoint 800 via one or more networks (not shown in the figures). Network interface 810 processes the communication according to one or more variety of communication standards such as but not limited to H.320, H.323, SIP, etc. and compression standards such as H.261, H.263, H.264, G.711, G.722; MPEG etc. Network interface 810 can receive and transmit control and data information to/from the centralized entity 700 or other endpoints 800. More information concerning the communication between the endpoint and the centralized entity 700 or other endpoints 800 over the relevant network and information that describing signaling, control, compression, and setting a video call can be found in the international telecommunication union (ITU) standards H.320, H.321, H.323, H.261, H.263 and H.264.

Network interface module 810 multiplexes/de-multiplexes the different signals, media and/or "signaling and control," that are communicated between the endpoint and the centralized entity 700 or the endpoint 800 and other endpoints 800. The compressed audio signal is transferred to and from the audio module 820. The compressed video signal is transferred to and from video module 850 and the "control and signaling" is transferred to and from control module 840.

Audio module 820 may receive, via network interface 810 and the audio line, compressed mixed audio stream from the centralized entity 700 or another endpoint 800. The audio module 820 decodes the compressed mixed audio stream, amplifies it, and transfers the decoded mixed audio stream toward the one or more loudspeakers (not shown) of the endpoint 800. In the other direction, the audio module 820 may process the audio that is obtained from the user of endpoint 800 by a microphone (not shown in the figures), compresses the audio signal, and sends the compressed audio toward the centralized entity 700 or other endpoint 800 via NI 810.

Control module 840 can be a logical unit that controls the operation of the endpoint 800. In addition to common operation of a typical endpoint, endpoint 800 is capable of additional functionality as result of having control module 840.

Some embodiment of video module 850 may comprise, among other elements, an encoder 851, a decoder 853, and a CP frame memory (CPFM) 859. An embodiment of CPFM 859 can be a cyclic buffer that is adapted to store decoded video data of at least two frames of the presented video stream. A completed frame from the CPFM 859 can be transferred toward a display unit of the endpoint 800 to be presented to the user of the endpoint 800.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

I claim:

1. A centralized entity for a video conferencing system, comprising:
    a network interface;
    an audio module, configured to receive an audio stream from the network interface and to send an audio stream to the network interface;
    a video module, configured to receive a video stream from the network interface and to send a video stream to the network interface; and
    a control module configured to manage connections with a plurality of mesh connected endpoints, wherein the control module is configured to cause the centralized entity to:
        establish connections with each endpoint of the plurality of mesh connected endpoints;
        receive a video stream at the video module from each endpoint of the plurality of mesh connected endpoints; and
        return a selected video stream from the video module to one or more endpoints of the plurality of mesh connected endpoints at a higher resolution than the video streams received by the one or more endpoints from the other endpoints of the plurality of mesh connected endpoints.

2. The centralized entity of claim 1, wherein the selected video stream corresponds to an active speaker.

3. The centralized entity of claim 1, wherein the control module is further configured to cause the centralized entity to:
receive a content stream from an endpoint of the plurality of mesh connected endpoints; and
send the content stream to one or more of the plurality of mesh connected endpoints.

4. The centralized entity of claim 1, wherein the control module is further configured to cause the centralized entity to:
receive a video stream at the video module from a legacy endpoint;
forward the video stream from the video module to each of the plurality of mesh connected endpoints; and
forward the video streams from the video module from each endpoint of the plurality of mesh connected endpoints toward the legacy endpoint.

5. The centralized entity of claim 4, wherein the control module is further configured to cause the centralized entity to:
transcode the video streams received from the plurality of mesh connected endpoints before forwarding the video streams from the video module to the legacy endpoint.

6. The centralized entity of claim 4, wherein the control module is configured to cause the centralized entity to forward the video streams from the video module toward the legacy endpoint via a media transcoding engine.

7. The centralized entity of claim 1, wherein the control module is further configured to cause the centralized entity to:
receive audio streams from the plurality of mesh connected endpoints; and
forward the audio streams to a media transcoding engine for delivery to a legacy endpoint.

8. The centralized entity of claim 1, wherein the control module is further configured to cause the centralized entity to:
receive audio streams from the plurality of mesh connected endpoints;
mix at least some of the audio streams into a mixed audio stream; and
forward the mixed audio stream to a legacy endpoint.

9. The centralized entity of claim 1, wherein the control module is further configured to cause the centralized entity to:
receive audio streams from the plurality of mesh connected endpoints;
mix at least some of the audio streams into a mixed audio stream; and
send the mixed audio stream to the plurality of mesh connected endpoints.

10. A non-transitory machine readable medium, on which are stored instructions, comprising instructions that when executed cause a centralized entity to:
establish connections with each endpoint of a plurality of mesh connected endpoints;
receive a video stream at a video module of the centralized entity from each endpoint of the plurality of mesh connected endpoints; and
return a selected video stream from the video module to one or more endpoints of the plurality of mesh connected endpoints at a higher resolution than the video streams received by the one or more endpoints from the other endpoints of the plurality of mesh connected endpoints.

11. The machine readable medium of claim 10, wherein the selected video stream corresponds to an active speaker.

12. The machine readable medium of claim 10, wherein the instructions further comprise instructions that when executed cause the centralized entity to:
receive a content stream from an endpoint of the plurality of mesh connected endpoints; and
send the content stream to one or more of the plurality of mesh connected endpoints.

13. The machine readable medium of claim 10, wherein the instructions further comprise instructions that when executed cause the centralized entity to:
receive a video stream at the video module from a legacy endpoint;
forward the video stream from the video module to each of the plurality of mesh connected endpoints; and
forward the video streams from the video module from each endpoint of the plurality of mesh connected endpoints toward the legacy endpoint.

14. The machine readable medium of claim 10, wherein the instructions further comprise instructions that when executed cause the centralized entity to:
receive audio streams from the plurality of mesh connected endpoints;
mix at least some of the audio streams into a mixed audio stream; and
forward the mixed audio stream to the plurality of mesh connected endpoints.

\* \* \* \* \*